United States Patent
Goenka (10) Patent No.: US 9,914,339 B2
(45) Date of Patent: *Mar. 13, 2018

(54) SUPPLEMENTAL THERMAL STORAGE

(71) Applicant: VISTEON GLOBAL TECHNOLOGIES, INC., Van Buren Township, MI (US)

(72) Inventor: Lakhi Nandlal Goenka, Ann Arbor, MI (US)

(73) Assignee: HANON SYSTEMS, Daejeon-si (KR)

( * ) Notice: Subject to any disclaimer, the term of this patent is extended or adjusted under 35 U.S.C. 154(b) by 792 days.

This patent is subject to a terminal disclaimer.

(21) Appl. No.: 13/753,864

(22) Filed: Jan. 30, 2013

(65) Prior Publication Data

US 2014/0213167 A1 Jul. 31, 2014

(51) Int. Cl.
*B60H 1/22* (2006.01)
*B60H 1/00* (2006.01)

(52) U.S. Cl.
CPC ............ *B60H 1/22* (2013.01); *B60H 1/00028* (2013.01); *B60H 2001/00228* (2013.01)

(58) Field of Classification Search
CPC .................. B60H 1/00028; B60H 1/22; B60H 2001/00228; B08B 15/002; B23K 26/1405; B23K 9/32
USPC ..................................................... 454/65, 67
See application file for complete search history.

(56) References Cited

U.S. PATENT DOCUMENTS

| | | | |
|---|---|---|---|
| 5,277,038 A * | 1/1994 | Carr .................... | B60H 1/00492 165/10 |
| 5,553,662 A * | 9/1996 | Longardner ....... | B60H 1/00492 165/10 |
| 6,068,046 A | 5/2000 | Pommier et al. | |
| 6,276,166 B1 | 8/2001 | Sarkisian et al. | |
| 6,361,429 B1 * | 3/2002 | Pawlak, III ........ | B60H 1/00207 454/139 |
| 6,691,527 B2 | 2/2004 | Bureau et al. | |
| 6,854,513 B2 | 2/2005 | Shirota et al. | |
| 7,147,071 B2 * | 12/2006 | Gering ............... | B60H 1/00278 165/164 |
| 7,156,156 B2 | 1/2007 | Haller et al. | |
| 7,478,670 B2 | 1/2009 | Richter et al. | |
| 7,735,330 B2 | 6/2010 | Richter et al. | |
| 7,879,122 B2 | 2/2011 | Richter et al. | |
| 8,191,618 B2 | 6/2012 | Gering et al. | |

(Continued)

FOREIGN PATENT DOCUMENTS

| | | |
|---|---|---|
| DE | 10147113 A1 | 4/2003 |
| DE | 10307641 B3 | 4/2004 |

(Continued)

*Primary Examiner* — Steven B McAllister
*Assistant Examiner* — Jonathan Cotov
(74) *Attorney, Agent, or Firm* — James D. Miller; Shumaker, Loop & Kendrick, LLP (57) ABSTRACT

The present technology relates to a heating, ventilation, and air conditioning (HVAC) system for a motor vehicle with supplemental thermal storage, the HVAC system having a length greater than a width and disposed with the length parallel to a longitudinal axis of the motor vehicle between the front seats thereof. The HVAC system includes a blower assembly disposed beneath an instrument panel of the motor vehicle or inside an engine compartment. A thermal storage device in thermal communication with air caused to flow through the HVAC system.

15 Claims, 6 Drawing Sheets

(56) References Cited

U.S. PATENT DOCUMENTS

| | | |
|---|---|---|
| 8,302,417 B2 | 11/2012 | Major et al. |
| 2005/0045320 A1 | 3/2005 | Richter et al. |
| 2005/0116054 A1 | 6/2005 | Richter et al. |
| 2006/0000595 A1* | 1/2006 | Kang ................ B60H 1/00064 165/203 |
| 2008/0110184 A1* | 5/2008 | Hirooka ............ B60H 1/00028 62/97 |
| 2008/0230204 A1 | 9/2008 | Richter et al. |
| 2009/0188266 A1 | 7/2009 | Hung et al. |
| 2009/0266094 A1 | 10/2009 | Major et al. |
| 2010/0006258 A1 | 1/2010 | Richter et al. |
| 2011/0036117 A1 | 2/2011 | Frohling et al. |
| 2011/0067421 A1 | 3/2011 | Shiraishi et al. |
| 2011/0174000 A1 | 7/2011 | Richter et al. |
| 2012/0003910 A1 | 1/2012 | Richter |
| 2012/0138697 A1 | 6/2012 | Richter |
| 2012/0152511 A1 | 6/2012 | Chang et al. |
| 2012/0174602 A1 | 7/2012 | Olivier et al. |
| 2012/0291986 A1 | 11/2012 | Richter |
| 2013/0000265 A1 | 1/2013 | Richter et al. |
| 2013/0008971 A1 | 1/2013 | Richter et al. |
| 2013/0145792 A1* | 6/2013 | Toyama ............. B60H 1/00207 62/498 |
| 2014/0213167 A1* | 7/2014 | Goenka ................... B60H 1/22 454/159 |

FOREIGN PATENT DOCUMENTS

| | | |
|---|---|---|
| DE | 102004051874 B3 | 5/2006 |
| DE | 102005012557 A1 | 9/2006 |
| DE | 102006009162 A1 | 11/2006 |
| DE | 102006008218 A1 | 12/2006 |
| DE | 102008002408 A1 | 12/2009 |

* cited by examiner

SUPPLEMENTAL THERMAL STORAGE

FIELD OF THE INVENTION

The invention relates to a heating, ventilation, and air conditioning (HVAC) system for a motor vehicle and, more particularly, to a modular HVAC system having minimal packaging requirements and thermal storage aspects.

BACKGROUND OF THE INVENTION

This section provides background information related to the present disclosure which is not necessarily prior art.

During the design of a motor vehicle, the shape and dimensions of the vehicle body are defined. This determines a maximum amount of space available for vehicle systems and components to be installed. The result of this process is often referred to as establishing the packaging requirements of components. The packaging requirements of HVAC systems, particularly air conditioning units, requires intensive development work because such equipment requires significant space that encroaches upon the interior passenger space of the vehicle. HVAC systems typically include a plurality of heat exchangers, a blower motor, and other electrical and mechanical components which must be accounted for in the packaging requirements.

Such development work is focused on minimizing a size of the HVAC system and on the position of the HVAC system within in the vehicle such that interference with passengers is minimized. As a result, the HVAC system is often placed in an instrument panel to maximize the foot space available to the driver and front seat passenger. However, placing an HVAC system in the instrument panel maximizes the space the instrument panel occupies in a front of the vehicle, thus increasing mounting space in a longitudinal direction of the vehicle.

Other issues with HVAC systems relate to energy utilization that may tax a power plant of the vehicle or an energy storage device of the vehicle. To minimize the energy utilization and maximize available occupant volume of the cabin environment, one approach is to heat and cool only the zone where an occupant is located. In certain instances, supplemental heating and cooling can be used to augment the thermal transfer capacity of the HVAC system.

There remains a need for an HVAC system that does not occupy space in an instrument panel while occupying a minimized amount of space in the interior of a vehicle that can provide supplemental heating and cooling capacity.

SUMMARY OF THE INVENTION

The present technology includes systems, processes, articles of manufacture, and compositions that relate an HVAC system having supplemental thermal storage capacity that does not occupy space in an instrument panel while occupying a minimized amount of space in the interior of a vehicle.

An HVAC system for a motor vehicle according to the present technology includes a housing, a blower assembly, and a thermal storage device. The housing has a length greater than a width, where the housing is disposed with the length substantially parallel to a longitudinal axis of the motor vehicle. The blower assembly is disposed within the housing and is adjacent an instrument panel of the vehicle. The thermal storage device is in thermal communication with air caused to flow through the HVAC system.

In some embodiments, the HVAC system includes a housing having a length greater than a width, the housing disposed with the length substantially parallel to a longitudinal axis of the motor vehicle. A blower assembly is disposed within the housing and adjacent an instrument panel of the vehicle. A heat exchanger is disposed within the housing, where the heat exchanger is in thermal communication with air caused to flow through the HVAC system. A thermal storage device is in thermal communication with the heat exchanger, where the thermal storage device including a phase change material.

In other embodiments, the HVAC system includes a housing, a blower assembly, a heat exchanger, and a thermal storage device. The housing has a length greater than a width, the housing disposed with the length substantially parallel to a longitudinal axis of the motor vehicle. The blower assembly is disposed within the housing, the blower assembly disposed adjacent an instrument panel of the vehicle. The heat exchanger is disposed within the housing, where the heat exchanger is in thermal communication with air caused to flow through the HVAC system. The thermal storage device is in thermal communication with the heat exchanger, where the thermal storage device includes a coolant loop in thermal communication with the heat exchanger and one of a coolant reservoir and a phase change material disposed outside of the housing.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF EXEMPLARY EMBODIMENTS OF THE INVENTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments. Except in the examples, or where otherwise expressly indicated, all numerical quantities in this description are to be understood as modified by the word "about" in describing the broadest scope of the technology.

Figure 1:
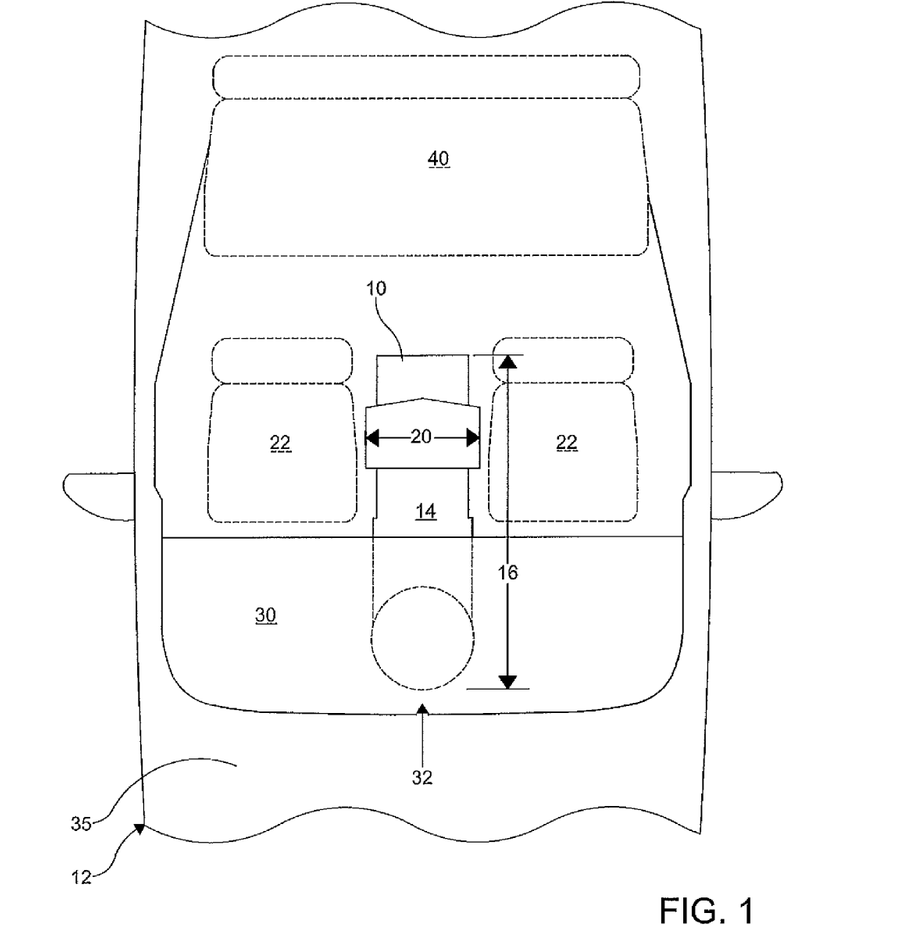
FIG. 1 is a fragmentary schematic top plan view of an interior of a portion of a motor vehicle having an HVAC system therein according to an embodiment of the present technology.
Figure 2:
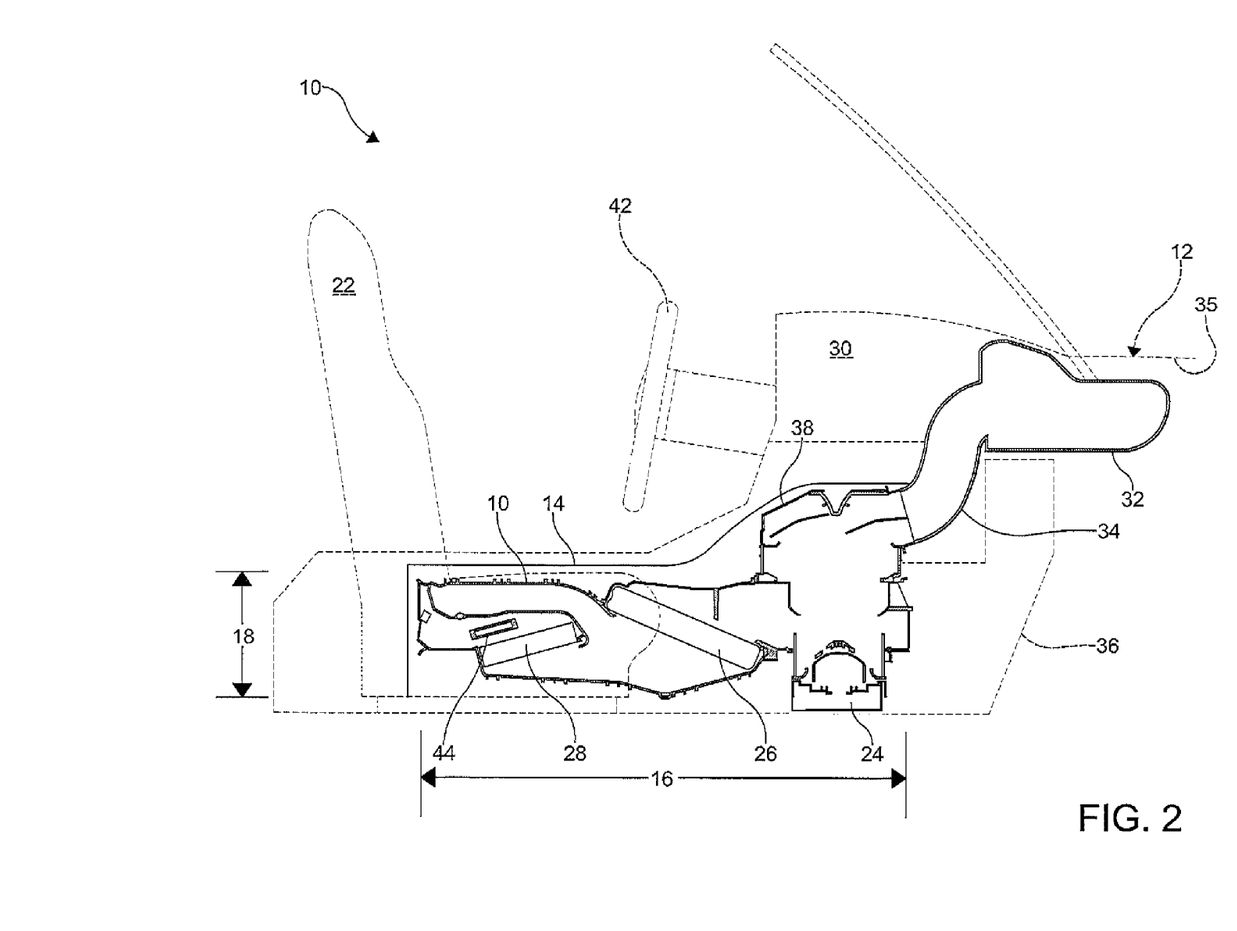
FIG. 2 is a cross-sectional view of the HVAC unit and a portion of the interior of FIG. 1.

FIGS. 1 and 2 show an HVAC system 10 according to an embodiment of the present technology. The HVAC system 10 is disposed in an interior of a motor vehicle 12, such as a motor vehicle having a combustion engine or a battery-powered motor vehicle, but the HVAC system 10 may be disposed in any vehicle requiring an HVAC system.

Figure 3:
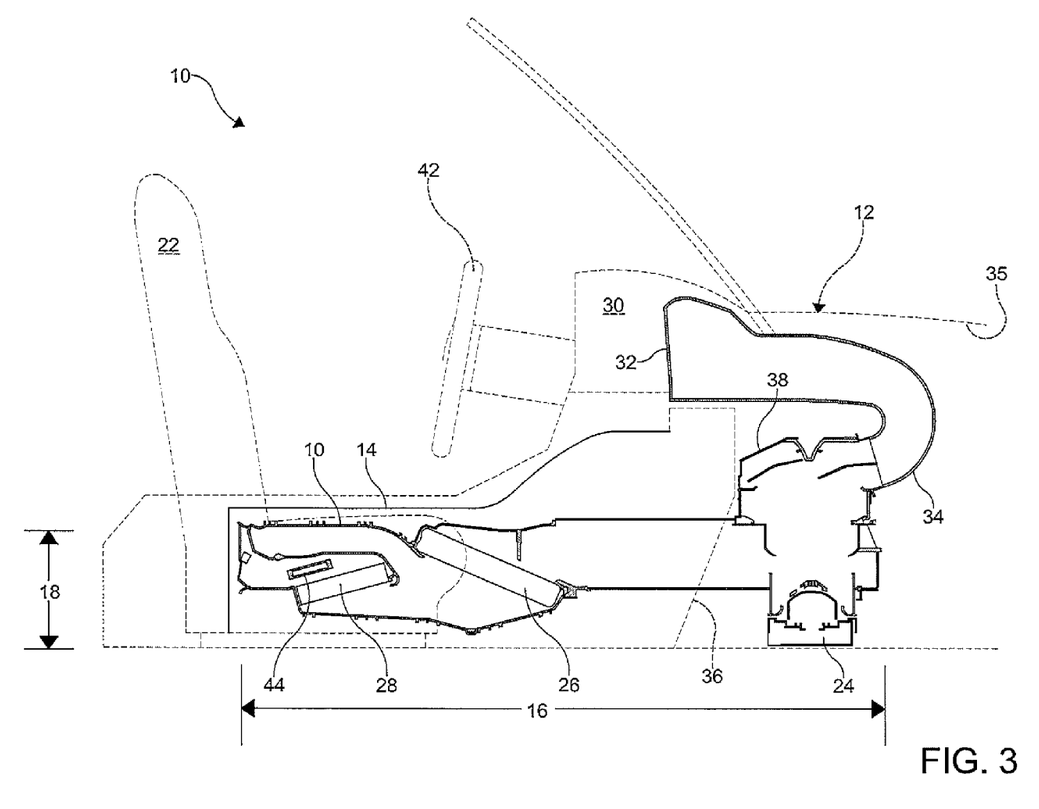
FIG. 3 is a cross-sectional view of an HVAC unit and a portion of an interior of a vehicle according to another embodiment of the present technology.
Figure 4:
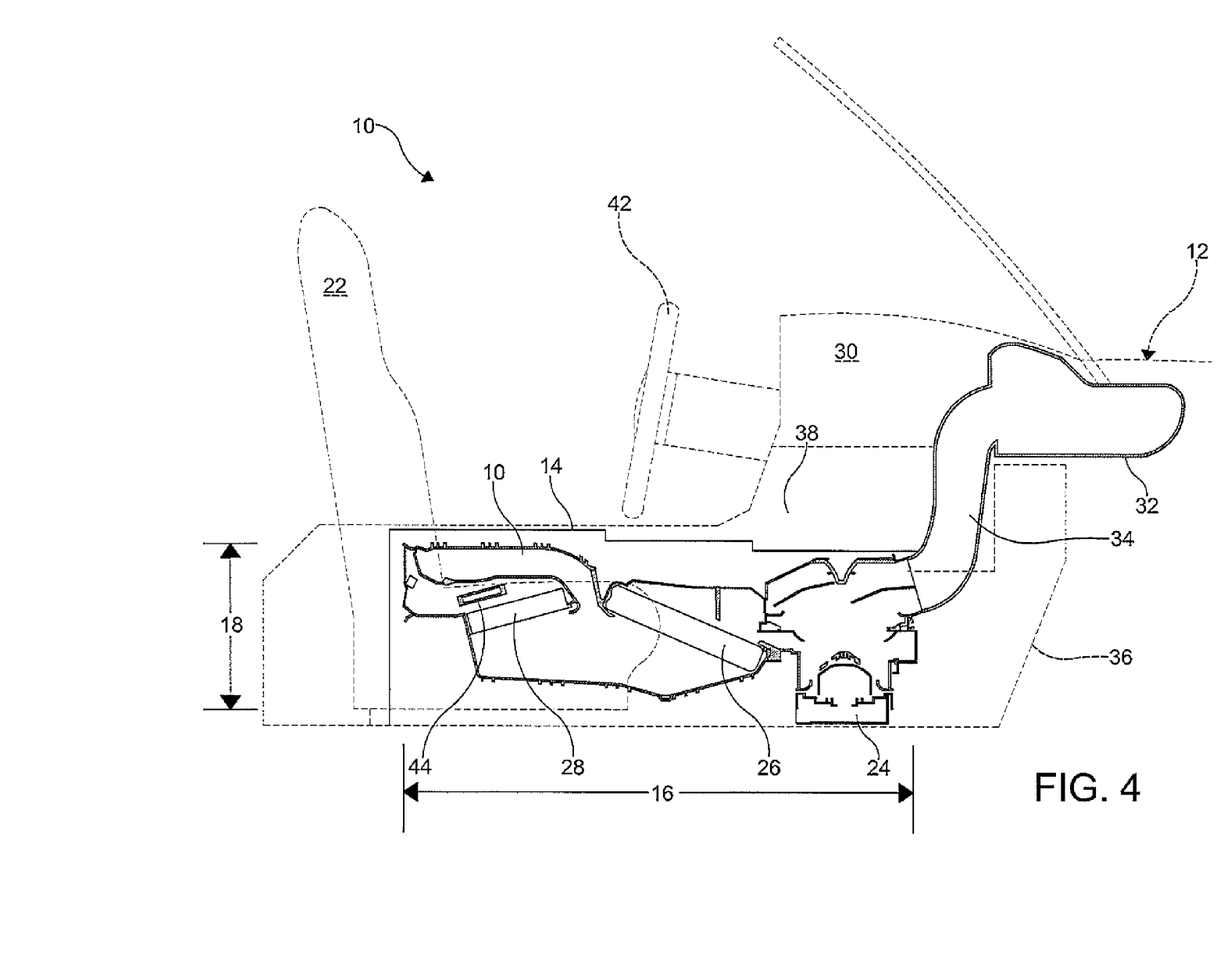
FIG. 4 is a cross-sectional view of an HVAC unit and a portion of an interior of a vehicle according to another embodiment of the present technology.

The HVAC system 10 includes a housing 14, a blower assembly 24, a first heat exchanger 26, and a second heat exchanger 28. The dimensions and shape of the housing mirror the general dimensions and shape of the components of the HVAC system 10 disposed therein. As shown in FIGS. 1-3, the components of the HVAC system 10 described herein are aligned in substantially the same plane at substantially the same elevation. However, the components may be oriented with the blower assembly 24 disposed at an elevation above that of either or both of the heat exchangers 26, 28, or the heat exchangers 26, 28 may be disposed at an elevation or elevations above that of the blower assembly 24. Similarly, each of the blower assembly 24, the first heat exchanger 26, and the second heat exchanger 28 may each be at different elevations resulting in an HVAC system 10 and a housing 14 having a stair-step cross-sectional shape, as shown in FIG. 4.

As shown in FIGS. 1-3, a length 16 of the HVAC system 10 is greater than a height 18 thereof. A width 20 of the HVAC system 10 is less than the length 16, but may be greater than or less than the height 18 thereof, as desired. As the width 20 of the HVAC system 10 increases, the height 18 decreases in order to minimize the impact on the packaging requirements of the interior of the vehicle 12. It is desirable to minimize the width 20 of the HVAC system in order to maximize passenger seating space. As best shown in FIG. 1, the HVAC system 10 is disposed between front seats 22 of the vehicle 12 with the length 16 of the HVAC system 10 substantially parallel to a central, longitudinal axis of the vehicle 12. A portion of the HVAC system 10 may be disposed between the front seats 22, such that only the portion containing one or both of the heat exchangers 26, 28, or the entire HVAC system 10 may be disposed therebetween, as desired.

The blower assembly 24 includes a fan, a motor, and other electrical components for drawing air into the HVAC system 10, through the heat exchangers 26, 28, and into the interior of the vehicle 12. The blower assembly 24 is in fluid communication with a fresh air cowl 32 via a conduit 34. The conduit 34 may be disposed partially or completely in the instrument panel 30, below the instrument panel 30, or in an engine compartment 35 of the vehicle 12, as desired. In the embodiment shown in FIGS. 1, 2 and 4, the blower assembly 24 is disposed in the interior of the vehicle 12 and beneath the instrument panel 30. In the embodiment of FIG. 3, the blower assembly 24 is disposed in the engine compartment 35 of the vehicle with a firewall 36 between the blower assembly 24 and the interior of the vehicle 12. The embodiment of FIG. 3 may be used in any motor vehicle, but may be best utilized in a battery-operated or hybrid vehicle having no internal combustion engine or a minimally-sized engine.

The first heat exchanger 26 is disposed downstream from the blower assembly 24 and upstream from the second heat exchanger 28. As shown in FIGS. 1-4, the first heat exchanger 26 is an evaporator adapted to cool air caused to flow through the HVAC system 10. The HVAC system 10 may include conduit (not shown) to provide fluid communication between the HVAC system 10, the first heat exchanger 26, the second heat exchanger 28, or a combination thereof and an exterior of the vehicle 12 to facilitate the flow of condensate therefrom. Typically, the conduit is in communication with a drain having a porous filter therein disposed in a floorboard of the vehicle 12 to facilitate efficient removal of the condensation. By providing conduit to facilitate a flow of condensation to an exterior of the vehicle, contact between condensate and electrical components of the HVAC system 10 and the vehicle 12 is minimized. It is understood that the first heat exchanger 26 may be downstream from the second heat exchanger 28, as desired.

The second heat exchanger 28 is disposed downstream from the first heat exchanger 26. As shown in FIGS. 1-4, the second heat exchanger 28 is a heater core for heating air caused to flow through the HVAC system 10. The second heat exchanger 28 may be any device capable of heating air, as desired. The second heat exchanger 28 may be in communication with a supplemental heater 44, such as a FTC heater, as shown in FIGS. 1-4, or the second heat exchanger 28 may be the only heater in the HVAC system 10. It is understood that the supplemental heater 44 may be any device capable of heating air, as desired.

In use, fresh air is drawn into the HVAC system 10 from an exterior of the vehicle 12 through the fresh air cowl 32 and through the conduit 34 by the blower assembly 24. The fresh air may be supplemented or replaced by recirculated air drawn through the HVAC system 10 from the interior of the vehicle 12 through a recirculated air opening 38. The recirculated air opening 38 is disposed adjacent the instrument panel 30, and may be disposed under the instrument panel 30, in front of the instrument panel 30, or as part of the instrument panel 30, as desired. The air is caused to flow through the heat exchangers 26, 28 by the blower assembly 24. In a cooling mode the air is caused to flow through the first heat exchanger 26 and then caused to flow through a vehicle distribution system (not shown) to cool an interior of the vehicle 12. In a heating mode, the air is caused to flow through the second heat exchanger 28 and caused to flow through a vehicle distribution system to heat an interior of the vehicle 12. The air flowing through the second heat exchanger 28 may also be heated by the supplemental heater 44. The vehicle distribution system comprises conduits or ducting (not shown) and vents (not shown). The HVAC system 10 may be used as a stand-alone HVAC system for the vehicle 12, or the HVAC system 10 may supplement a standard HVAC system as known in the art. The HVAC system 10 may be in fluid communication with vehicle distribution systems having ducting and vents to provide heated or cooled air to the front passenger compartment, rear passenger compartment, both the front and the rear passenger compartments of the vehicle, to and through the front seats 22 and/or the rear seats 40, and/or to and through a steering wheel 42 of the vehicle.

Because the blower assembly 24 is either below the instrument panel 30 (FIGS. 1, 2, and 4) or behind the firewall 36 and in the engine compartment (FIG. 3), the noise, vibration, and harshness (NVH) associated with the HVAC system 10, and the blower assembly 24 in particular, is minimized so as not to disturb passengers in the vehicle 12 during operation. Another benefit of the location of the blower assembly 24 is that the space occupied by components of the HVAC system 10 in the instrument panel 30 is minimized, thereby freeing up packaging space in the instrument panel 30 for other components or to facilitate a minimally-sized instrument panel 30 for a more open front end of the interior of the vehicle 12. By having the length 16 of the HVAC system 10 greater than the width 20 thereof and the HVAC system 10 disposed parallel to a central, longitudinal axis of the vehicle 12, the HVAC system 10 occupies space in the vehicle that is typically not utilized, such as under the instrument panel 30 or that is underutilized as empty space or storage space, such as a center console. Also, in the embodiment of the HVAC system 10 of FIGS. 1, 2, and 4, the blower assembly 24 disposed beneath the instrument panel 30 in the housing 14 and is more easily accessed for maintenance purposes and to replace associated air filtration devices (not shown).

Figure 5:
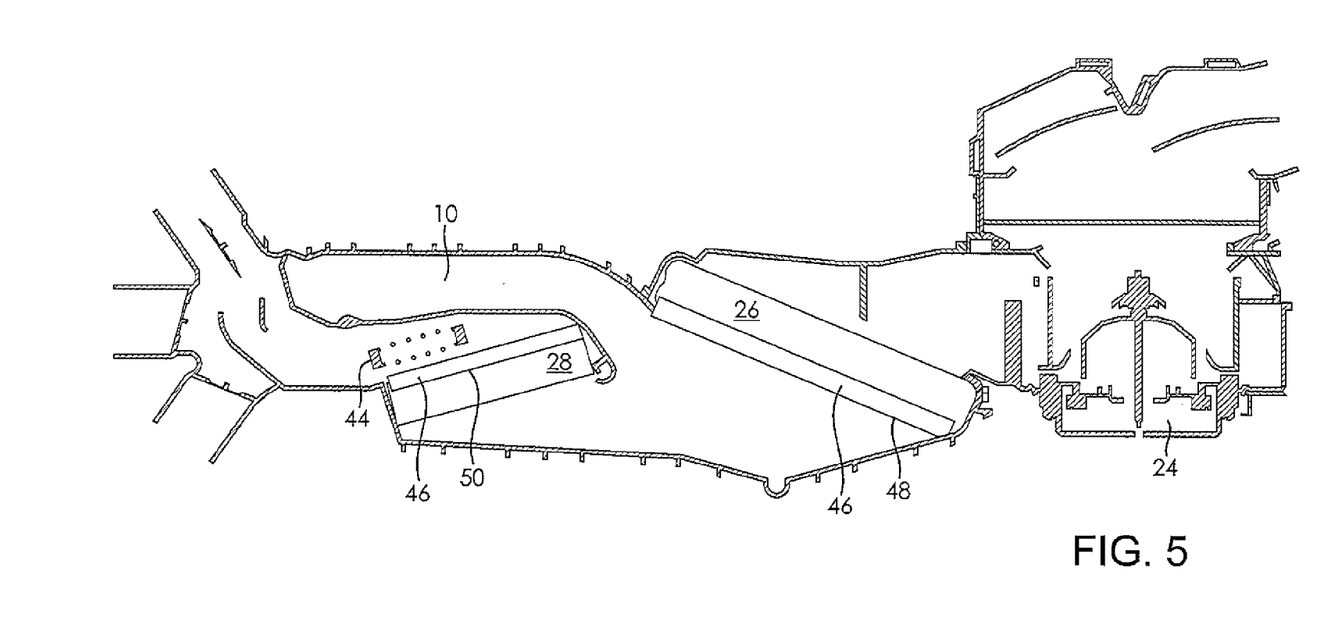
FIG. 5 is a cross-sectional view of a portion of an HVAC unit according to another embodiment of the present technology.
Figure 6:
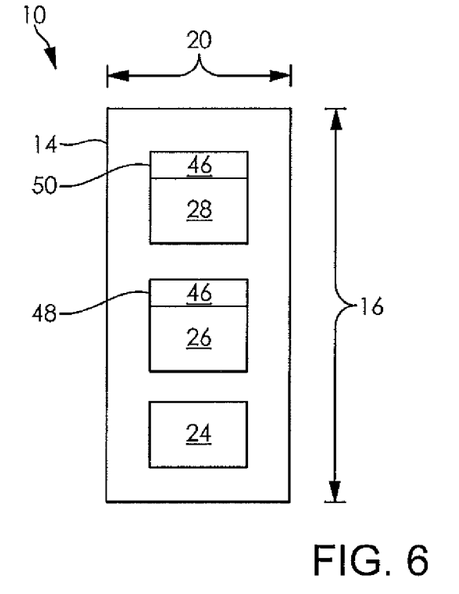
FIG. 6 is a schematic top plan view of an HVAC unit according to another embodiment of the present technology.
Figure 7:
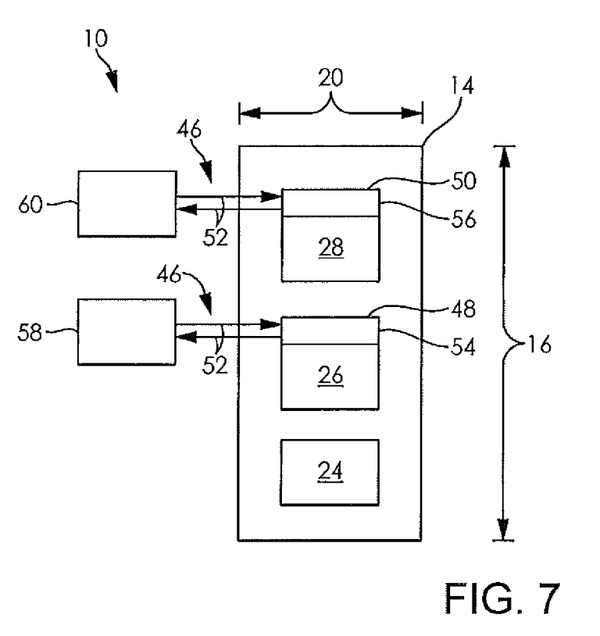
FIG. 7 is a schematic top plan view of another HVAC unit according to yet another embodiment of the present technology.

With reference to FIGS. 5-7, further embodiments of the HVAC system 10 for the motor vehicle 12 are shown. The housing 14 has the length 16 greater than the width 20, as shown in FIG. 1, where the housing 14 is disposed with the length 16 substantially parallel to the longitudinal axis of the motor vehicle 12. The blower assembly 24 is disposed within the housing 14 and is adjacent the instrument panel 30 of the motor vehicle 12. A thermal storage device 46 is in thermal communication with air caused to flow through the HVAC system 10. For example, the thermal storage device 46 can include a first thermal storage device 48 in thermal communication with the first heat exchanger 26 and/or a second thermal storage device 50 in thermal communication with the second heat exchanger 28.

The thermal storage device 46 can be disposed entirely inside the housing 14, as shown in FIG. 6. Alternatively, a portion of the thermal storage device 46 can be disposed outside the housing 14, as shown in FIG. 7. For example, the thermal storage device 46 can include a coolant loop 52 to transfer heat between a portion 54, 56 of the thermal storage device 46 located inside of the housing 14 and a portion 58, 60 of the thermal storage device 46 located outside of the housing 14. The portion 54, 56 located inside of the housing 14 can include a conduit or reservoir in thermal communication with the first heat exchanger 26 and/or the second heat exchanger 28. The portion 58, 60 located outside of the housing 14 can include a reservoir of coolant 58, 60. As shown in FIG. 7, one reservoir 58 is fluidly coupled to portion 54 and another reservoir 60 is fluidly coupled to portion 56. However, the reservoirs 58, 60 can also be configured as a single reservoir (not shown). Moreover, the reservoirs 58, 60 can be in thermal communication with other devices and other thermal transfer apparatus within the vehicle. The reservoirs 58, 60 can also include a phase change material to provide a source of latent heat.

As shown, one or more thermal storage devices 46 can be in thermal communication with one or more heat exchangers 26, 28 disposed within the housing. For example, the first thermal storage device 48 can be in thermal communication with the first heat exchanger 26, where the first heat exchanger 26 can be an evaporator, and the second thermal storage device 50 can be in thermal communication with the second heat exchanger 28, where the second heat exchanger 28 is a heater core.

The thermal storage device 46 can include a phase change material to operate as heat source or a heat sink. For example, the phase change material can serve as a store of latent heat that can be transferred to the HVAC system 10 in order to provide supplemental thermal energy for heating one or more occupant zones within the vehicle 12. Alternatively, heat from the first heat exchanger 26 or the second heat exchanger 28 can be transferred to the first thermal storage device 48 or the second thermal storage device 50, respectively, and subsequently to the phase change material where it is stored. Examples of various phase change materials include salt hydrates, fatty acids and esters, various paraffins, and ionic liquids.

In a particular embodiment of the present technology, the HVAC system 10 for the motor vehicle 12 includes the housing 14, the blower assembly 24, a heat exchanger such as the first heat exchanger 26 or the second heat exchanger 28, and the thermal storage device 46. The housing 14 has the length 16 greater than the width 20 and is disposed with the length 16 substantially parallel to the longitudinal axis of the motor vehicle 12. The blower assembly 24 is disposed within the housing 14 and is disposed adjacent the instrument panel 30 of the vehicle 12. The heat exchanger 46 is disposed within the housing 14 and is in thermal communication with air caused to flow through the HVAC system 10. The thermal storage device 46 is in thermal communication with the heat exchanger (e.g., first heat exchanger 26 or second heat exchanger 28) and includes a phase change material.

In another particular embodiment of the present technology, the HVAC system 10 for a motor vehicle 12 includes the housing 14 having the length greater 16 than the width 20, the housing 14 being disposed with the length 16 substantially parallel to a longitudinal axis of the motor vehicle 12. The blower assembly 24 is disposed within the housing 14, the blower assembly 24 is also disposed adjacent the instrument panel 30 of the motor vehicle 12. The heat exchanger (e.g., the first heat exchanger 26 or the second heat exchanger 28) is disposed within the housing 14, the heat exchanger being in thermal communication with air caused to flow through the HVAC system 10. The thermal storage device 46 is in thermal communication with the heat exchanger (e.g., the first heat exchanger 26 or the second heat exchanger 28), the thermal storage device 46 including a coolant loop 52 in thermal communication with the heat exchanger (e.g., the first heat exchanger 26 or the second heat exchanger 28) and one of the coolant reservoirs 58, 60 and a phase change material disposed outside of the housing 14.

The present technology affords several advantages and benefits. These include the capacity to provide supplemental thermal energy to one or more zones within a vehicle. For example, an occupant may desire additional heating or cooling separate from another occupant of the vehicle. The supplemental thermal storage devices used in the HVAC systems described herein can therefore provide an increase in the heating or cooling capacity of the HVAC system or can provide a more rapid heating or cooling effect on demand. In this way, the present HVAC systems can better respond to the climate control requests of a particular occupant of the vehicle to provide zonal conditioning or the system can provide an improved response for the entire interior of the vehicle to the benefit of all occupants.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. An HVAC system for a motor vehicle comprising:
   a housing having a length greater than a width, the housing disposed with the length substantially parallel to a longitudinal axis of the motor vehicle;
   a blower assembly disposed within the housing, the blower assembly disposed adjacent an instrument panel of the motor vehicle;
   a first heat exchanger and a second heat exchanger disposed within the housing;
   a first thermal storage device in thermal communication with the first heat exchanger and air caused to flow through the HVAC system; and
   a second thermal storage device in thermal communication with the second heat exchanger and the air caused to flow through the HVAC system, wherein a portion of the housing is disposed between front seats of the motor vehicle, wherein the second thermal storage device is disposed within the portion of the housing, wherein the first heat exchanger and the second heat exchanger are slopingly disposed in the housing and an upper end of the first heat exchanger and an upper end of the second heat exchanger are closer than a lower end of the first heat exchanger and a lower end of the second heat exchanger, and wherein an inlet of a cool air bypass duct is formed between the upper end of the first heat exchanger and the upper end of the second heat exchanger.

2. The HVAC system of claim 1, wherein the blower assembly is disposed beneath the instrument panel.

3. The HVAC system of claim 1, wherein the blower assembly is disposed in an engine compartment of the motor vehicle.

4. The HVAC system of claim 1, wherein the blower assembly is in fluid communication with an exterior of the motor vehicle.

5. The HVAC system of claim 4, further comprising a fresh air cowl in fluid communication with the blower assembly providing fluid communication between the exterior and the blower assembly to facilitate a flow of fresh air through the HVAC system.

6. The HVAC system of claim 5, further comprising a conduit providing fluid communication between the fresh air cowl and the blower assembly.

7. The HVAC system of claim 1, further comprising a recirculated air opening formed in the housing providing fluid communication between an interior of the motor vehicle and the blower assembly.

8. The HVAC system of claim 1, wherein the blower assembly is in fluid communication with at least one of the front seats of the motor vehicle, a rear seat of the motor vehicle, and a steering wheel of the motor vehicle.

9. The HVAC system of claim 1, wherein the housing has a stair-step cross-sectional shape.

10. The HVAC system of claim 1, wherein the first thermal storage device includes a coolant loop to transfer heat between the inside of the housing and the outside of the housing.

11. The HVAC system of claim 1, wherein the first heat exchanger comprises a heater core and the second heat exchanger comprises an evaporator.

12. The HVAC system of claim 1, wherein the first thermal storage device comprises a phase change material.

13. The HVAC system of claim 1, wherein the first thermal storage device comprises a reservoir containing a coolant.

14. An HVAC system for a motor vehicle comprising:
   a housing having a length greater than a width, the housing disposed with the length substantially parallel to a longitudinal axis of the motor vehicle;
   a blower assembly disposed within the housing, the blower assembly disposed adjacent an instrument panel of the motor vehicle;
   a first heat exchanger and a second heat exchanger disposed within the housing; and
   two thermal storage devices, at least a portion of each of the thermal storage devices respectively disposed within the housing in series with the first heat exchanger and the second heat exchanger with respect to a flow of air through the housing, wherein a portion of the housing is disposed between front seats of the motor vehicle, wherein each of the thermal storage devices is disposed within the portion of the housing, and wherein the first heat exchanger and the second heat exchanger are slopingly disposed in the housing.

15. An HVAC system for a motor vehicle comprising:
   a housing having a length greater than a width thereof, the housing disposed with the length substantially parallel to a longitudinal axis of the motor vehicle;
   a blower assembly disposed within the housing, the blower assembly disposed adjacent an instrument panel of the motor vehicle; and
   a first heat exchanger and a second heat exchanger disposed within the housing, wherein a portion of the housing is disposed between front seats of the motor vehicle, wherein the first heat exchanger and the second heat exchanger are slopingly disposed in the housing and wherein an upper end of the first heat exchanger and an upper end of the second heat exchanger are closer to each other than a lower end of the first heat exchanger and a lower end of the second heat exchanger, and wherein an inlet of a cool air bypass duct is formed between the upper end of the first heat exchanger and the upper end of the second heat exchanger.

* * * * *